United States Patent
Chen et al.

(10) Patent No.: US 9,755,694 B2
(45) Date of Patent: Sep. 5, 2017

(54) WALL-EMBEDDED POWER LINE COMMUNICATION DEVICE

(71) Applicant: ZyXEL communications Corp., Hsinchu (TW)

(72) Inventors: Tzung-Pao Chen, Hsinchu County (TW); Tzu-Lung Lin, Hsinchu (TW); Chin-Ru Lin, Hsinchu (TW); Chen-Ju Lai, Hsinchu (TW)

(73) Assignee: ZyXEL communications Corp., Hsinchu (TW)

( * ) Notice: Subject to any disclaimer, the term of this patent is extended or adjusted under 35 U.S.C. 154(b) by 443 days.

(21) Appl. No.: 14/220,152

(22) Filed: Mar. 20, 2014

(65) Prior Publication Data

US 2015/0155911 A1     Jun. 4, 2015

Related U.S. Application Data

(60) Provisional application No. 61/911,454, filed on Dec. 3, 2013.

(51) Int. Cl.
| | | |
|---|---|---|
| *H04B 3/02* | (2006.01) | |
| *H04B 3/54* | (2006.01) | |
| *H04B 3/58* | (2006.01) | |

(52) U.S. Cl.
CPC ............... *H04B 3/02* (2013.01); *H04B 3/54* (2013.01); *H04B 3/58* (2013.01); *H04B 2203/5458* (2013.01)

(58) Field of Classification Search
CPC ... H04B 3/02; H04B 3/54; H04B 3/58; H04B 2203/5458
See application file for complete search history.

(56) References Cited

U.S. PATENT DOCUMENTS

| | | | | |
|---|---|---|---|---|
| 5,168,170 A | * | 12/1992 | Hartig ................... | H02J 3/14 307/34 |
| 5,739,592 A | * | 4/1998 | Rigsby .................. | B60D 1/62 280/422 |
| 6,755,783 B2 | * | 6/2004 | Cosentino ............ | A61B 5/7475 128/903 |
| 7,136,936 B2 | * | 11/2006 | Chan ..................... | H04B 3/542 370/463 |
| 7,885,716 B2 | * | 2/2011 | Yamashita ............. | H04B 3/54 375/257 |
| 2004/0073597 A1 | * | 4/2004 | Caveney ................ | H04L 12/10 709/200 |
| 2012/0275526 A1 | * | 11/2012 | Hughes .................. | H04B 3/542 375/257 |

\* cited by examiner

*Primary Examiner* — Zeev V Kitov
(74) *Attorney, Agent, or Firm* — Winston Hsu (57) ABSTRACT

A "wall-embedded" power-line-communication (PLC) enabled device connecting with the home network backbone through the PLC technology is disclosed. The wall-embedded PLC enabled device includes at least a system module, a front panel, and a holder. With flexible, modular architecture, the device can easily optionally integrate required functions, such as sensors, actuators and so on, or additional heterogeneous communication interfaces, to extend the service coverage, to support the specific smart-house services, and other uses.

20 Claims, 10 Drawing Sheets

(Room Master)

FIG. 4
Inner architecture of room master

WALL-EMBEDDED POWER LINE COMMUNICATION DEVICE

CROSS REFERENCE TO RELATED APPLICATIONS

This application claims priority to U.S. Provisional Patent Application No. 61/911,454, filed Dec. 3, 2013, included herein by reference in its entirety for all intents and purposes.

BACKGROUND OF THE INVENTION

1. Field of the Invention

This application relates to a power-line-communication (PLC) enabled device, and more specifically to a wall-embedded PLC device connecting with the home network backbone through the PLC technology to integrate required functions.

2. Description of the Prior Art

With continuous expansion and maturation of the Internet, "Computing" has been gradually transited from a device-centric model, a simple server-client model, to a cloud-client collaboration model. With the development of technology, applications are not bound to people and devices. The new structure of Devices, Networks and Applications (DNA) will support the new-generation applications. The rich capabilities of the "DNA" model come from the multi-way interactions between "People", "Devices" and "Applications" over the "Networks".

In the "DNA" model, a device is no longer only to passively execute the received commands. It can actively contribute the valued data to the applications or the other devices for the more precise analysis or more user-friendly presences of the applications to the people. In the term of "DNA", "Network" is one of the major cores to support the success of "DNA". Therefore, how to set up a seamless, all-connected-together network becomes as a quite important issue, such as, offering an intuitive way in the accessing the multimedia data stored in the home Network-attached Storage (NAS) from the Internet, or informing you of an urgent event immediately when the smoke sensor in your home is triggered no matter where you are.

To plan the End-to-End Networks is very complicated and needs to be categorized. A Home Network is a major category with which to be concerned. In a home environment, the home network can be roughly categorized as a Wide Area Network (WAN), a Local Area Network (LAN), and a Home Area Network (HAN). Using the WAN, for example, xDSL, xPON, or 3G/LTE, is mainly for connecting to the Internet. Using the LAN, for example, Ethernet, Wi-Fi, or HomePlugAV, usually is a kind of high-speed communication technology, and mainly applies to construction of the home-network backbone or to provide a networked connection for an object (device) for the high-speed applications, such as, media streaming. The HAN, for example, Z-Wave, ZigBee, Bluetooth, HomePlug Green-PHY, and so on, usually is a kind of suitable-speed, but, low-powered communication technology, and mainly applies to build up the control/sensor network.

The HAN network is beginning to be present in a home network and ready to fulfill the new coming "Smart-Home" services, like Smart Energy, e-Health, Home Automation and so on. A lot of HAN technologies already exist in the market, but none currently dominates. In general, the different types of HAN technologies are applied to different services. For example, Bluetooth plays as a major HAN technology in Health-relative applications. But for home-automation services, Zigbee, Z-Wave, or others are preferred. Therefore, in the real deployment, it is quite impossible to fulfill multiple applications by only one technology in the home environment. Hierarchically planning the home network by the different, heterogeneous technologies over the different transmission media, ex. wireless, power-line, coaxial cable, phone line, and so on, is the better way.

SUMMARY OF THE INVENTION

With this in mind, a wall-embedded power line communication device comprising a system module configured to provide a power line communication interface, and an extended-function module coupled to the power line communication interface and/or a heterogeneous communication module coupled to the power line communication interface and configured to communicate with devices without PLC technology is disclosed.

The wall-embedded power line communication device may further include a data processing unit, a PLC interface unit, an AC-DC power converter unit configured to provide power for the wall-embedded power line communication device, and a system-module interface unit configured to provide communications between the system module and the extended-function module and/or between the system module and the heterogeneous communication module.

The data processing unit of the wall-embedded power line communication device may comprise a remote management software agent executed by a data processing unit for communicating with a remote management server running a remote management software package, wherein the remote management software agent may be configured to offload data to the remote management server for analysis and determination of optimized actions, provide remote access capability from the Internet, provide monitoring services, to remotely control external objects, to monitor temperature and/or humidity and/or luminance in the area, to collect physiologic data and/or monitor events generated by remotely, and to integrate with service providers to offer remote health advisory services.

These and other objectives of the present invention will no doubt become obvious to those of ordinary skill in the art after reading the following detailed description of the preferred embodiment that is illustrated in the various figures and drawings.

DETAILED DESCRIPTION

The invention provides an easy, effective way to take power line communication (PLC) as the home-network backbone and also provide a wall-embedded PLC-enabled device, herein called a "Room Master", assisting to build up the seamless connections and transitions between various technologies, such as, inter alia, WAN, LAN, and HAN in the home network.

In general, it is the friendlier way for people to connect to the Internet through a "wireless" network, such as Wi-Fi and so on. However, there are many factors, such as building layouts, building materials, building dimensions, and so on, that often cause frustrations when people attempt to connect to the Internet at some dead spots in their home if only a simple home network configuration is available. For example, in a multi-floor residential house a single, primary Wi-Fi Access Point (AP), usually embedded in the Residential Gateway (RGW), may not support the whole-home coverage. It is highly likely that the people need to install one or more assistant APs somewhere in the house to extend the coverage to the dead areas that the primary AP cannot reach. A "Room Master", connecting to a home network backbone by PLC technology, is a "modular platform". When providing the extended Wi-Fi capability, it can act as the assistant AP to extend the Wi-Fi coverage in home environments. Not just for Wi-Fi, the function can apply for the other technologies, for example, inter alia, MoCA, GreenPHY, and Zigbee, over the respective media, for example, inter alia, coaxial-cable or a phone-line.

In general, the people can install sensors or actuators in their residential house for the new smart home services, such as smart energy, home automation, and so on. The sensors or actuators can be accessed as sub-functions in a device, such as thermostat, smart phones, wearable devices, and so on. However, people also can install the "independent" sensors or actuator devices as they like anywhere such as in wall, at ceiling, on or in the human body, and so on. The sensor can be used to collect the information, such as temperature, humidity, luminance, power usage, healthy index, or urgent events and so on, for analysis. The actuator can be used to execute the actions activated by the users or the system's intelligences, such as powering on/off switches, dimmers, speakers, and so on. These sensors and actuators usually connect to a home network through a kind of HAN technologies. Additionally, for the new smart home services, it is usual that an "aggregator" is in the middle of the sensors, actuators, users, and the optional backhaul servers. The "aggregator" is used to collect the data from the sensors and apply the commands to the actuators to execute within its service area. The aggregator usually equips one or more HAN interfaces, by the service type, to communicate with the independent sensors or actuators within its service coverage. If users apply multiple, different smart home services, multiple independent aggregators equipped with the different HAN technologies can be installed in their houses. If coverage issues of these HAN technologies without good architectures are not considered, the resulting home network often gives less than desired functionality.

A Room Master, connecting to the home network backbone by the PLC technology, is a "modular platform". The modular architecture can support the variant HAN technologies based on the same hardware (HW) and act as a specific or multi-functional aggregator by the service type. The Room Master also assists to solve the potential HAN's service-coverage issues in the home network. In the residential house, the different services usually are required in the different applied areas. For example, in a garage, remote control service for the door-open/door-close is more important than Internet access service. In an elder's bedroom, healthcare service that can collect the health index and monitor the elder's daily living is preferred. In the kid's bedroom, Internet access service may be the highest priority. In the kitchen, a mother needs the services that can intelligently, automatically manage and control various appliances.

The invention discloses a device called a Room Master. A Room Master is a "wall-embedded" installed PLC-enabled device and connects with the home network backbone through the PLC technology. Additionally, with its flexible, modular architecture, the Room Master, with the same hardware, can easily optionally integrate the required functions, such as sensors, actuators, or the additional heterogeneous communication interfaces, for example, Zigbee, Wi-Fi, and so on, to extend the service coverage, to support the specific smart-house services and other uses. The modular platform of the Room Master can assist to plan the home network efficiently by peoples' household configurations and the service requirements and easier on-site installation or repairing.

Figure 1:
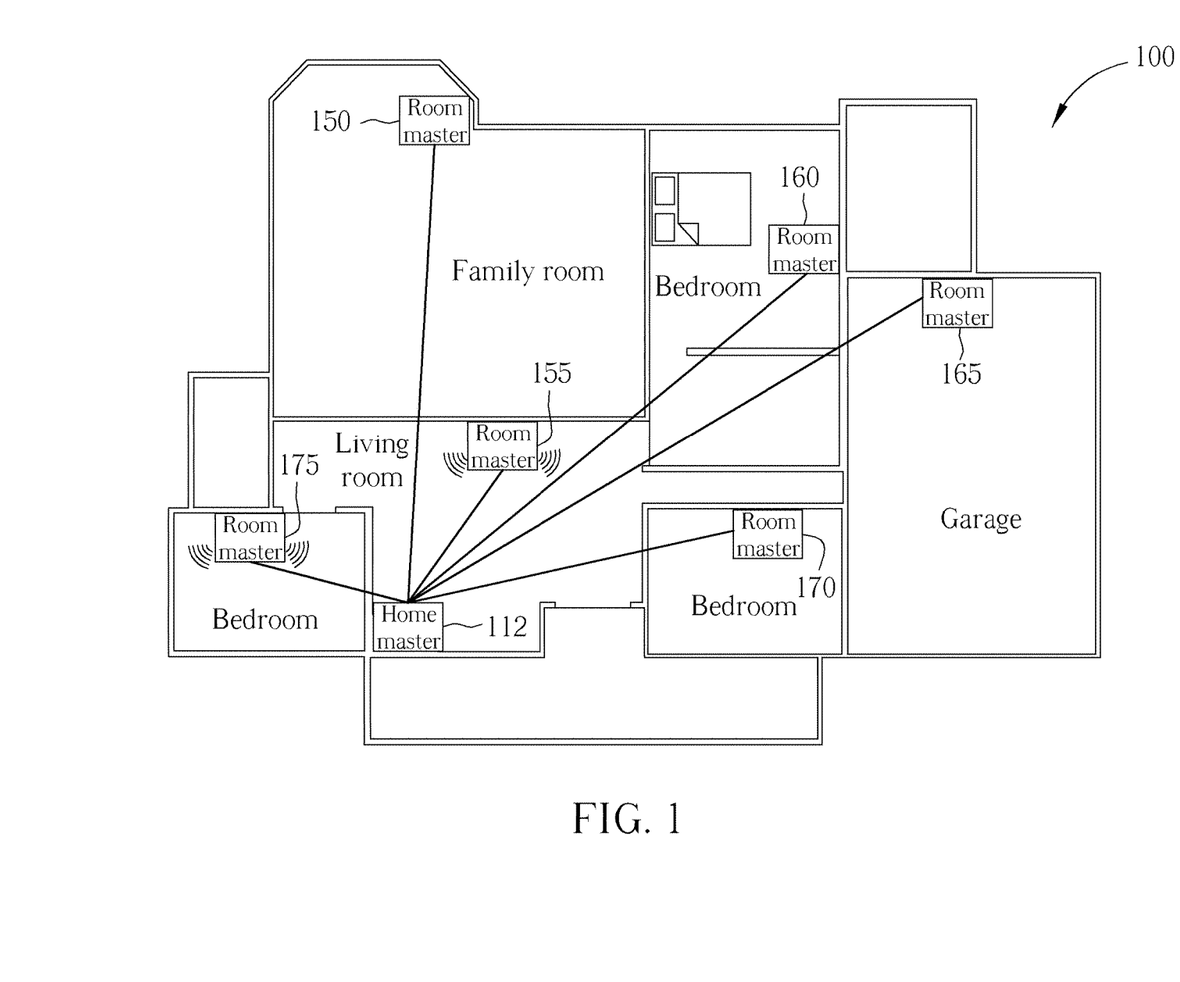
FIG. 1 illustrates an example home deployment system according to one embodiment.

FIG. 1 is an example for the deployment of room masters in a house. Not like its name, the service coverage of a Room Master is not limited, and its use is not restricted to being in a house, as deployment in other locations such as, inter alia, an office, a store, a restaurant, or hotel is intended to be within the scope of the application. Furthermore, it can extend coverage across walls and floors in the whole home by the different device configurations. For example, with a 1×1 Wi-Fi configuration, room-range service is good. With 3×3 multiple-input and multiple-output (MIMO) Wi-Fi configuration, the floor-coverage should be fine.

FIG. 1 illustrates an example home deployment system 100. As shown, the example home deployment system 100 may include a Home Master unit 112 which may function similarly to an access point to the Internet. A plurality of Room Masters 150, 155, 160, 165, 170, and 175 may be located throughout the home deployment 100. For example, the Family room may serve as a location for a Room Master 150 having one or more functionalities while the Garage may serve as a location for a Room Master 165 which may or may not have a different set of functionalities. Each Room Master 150, 155, 160, 165, 170, and 175 uses PLC technology for at least a portion of its communications and may or may not connect to the Home Master 112 depending upon deployment preferences.

The Room Master can function independently or operate hierarchically with an optional high-layer Home Master or Cloud Master. For example, the Room Masters 280, and 290 in FIG. 2 can offload their individual, limited intelligence to the Home Master 210. The Room Masters 280 and 290 collect the data and may send the data back to the Home Master 210. The Home Master 210, with more powerful computation capability can analyze the data and determine the actions for the Room Master to execute respectively or upload the data to the "Cloud Master" 230 via the Internet for the more integrated applications. The Cloud Master 230, acting as a Middleware between Cloud Services and Home Master/Room Master, will assist the deployments and operations of cloud services into the home. For example, with the assistance of the Cloud Master 230, people can remotely control their air conditioner or any other available service through the Internet, preferably using a Remote Management User Interface (Remote Mgt. UI) such as 220, 225, 232, and/or 235. The Home Master 210 and the Cloud Master 230 may facilitate these connections through the use of a comprised Remote Management Server 253, 254 and/or a Remote Management Software Package 255.

Figure 2:
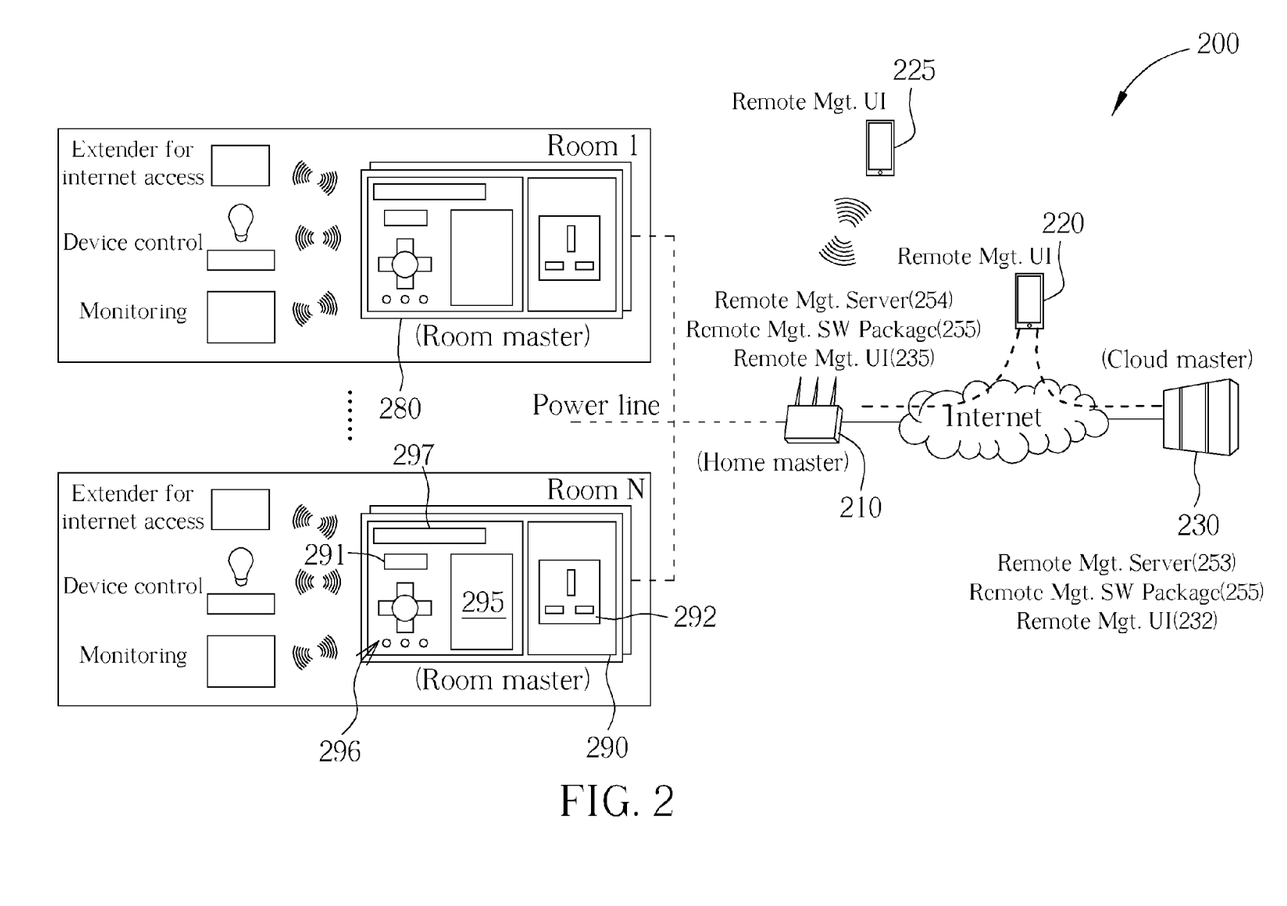
FIG. 2 illustrates possible uses for a Room Master, such as an extender for Internet access, device control, and/or monitoring.

FIG. 2 further illustrates possible uses for a Room Master 290, such as an extender for Internet access, device control, and/or monitoring. The Room Master may also include an antenna 297, a speaker and/or microphone 291, a control interface 296, a display 295, and a standard electrical outlet 292 which may be used by any device requiring an electrical outlet.

Figure 3:
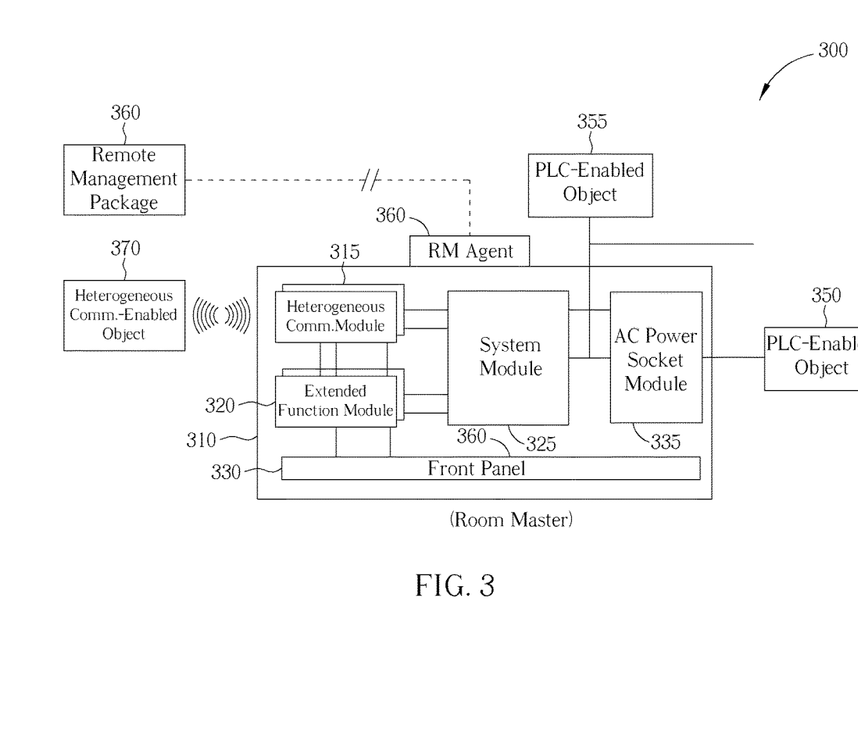
FIG. 3 illustrates possible relationships of the Room Master and external parties.
Figure 4:
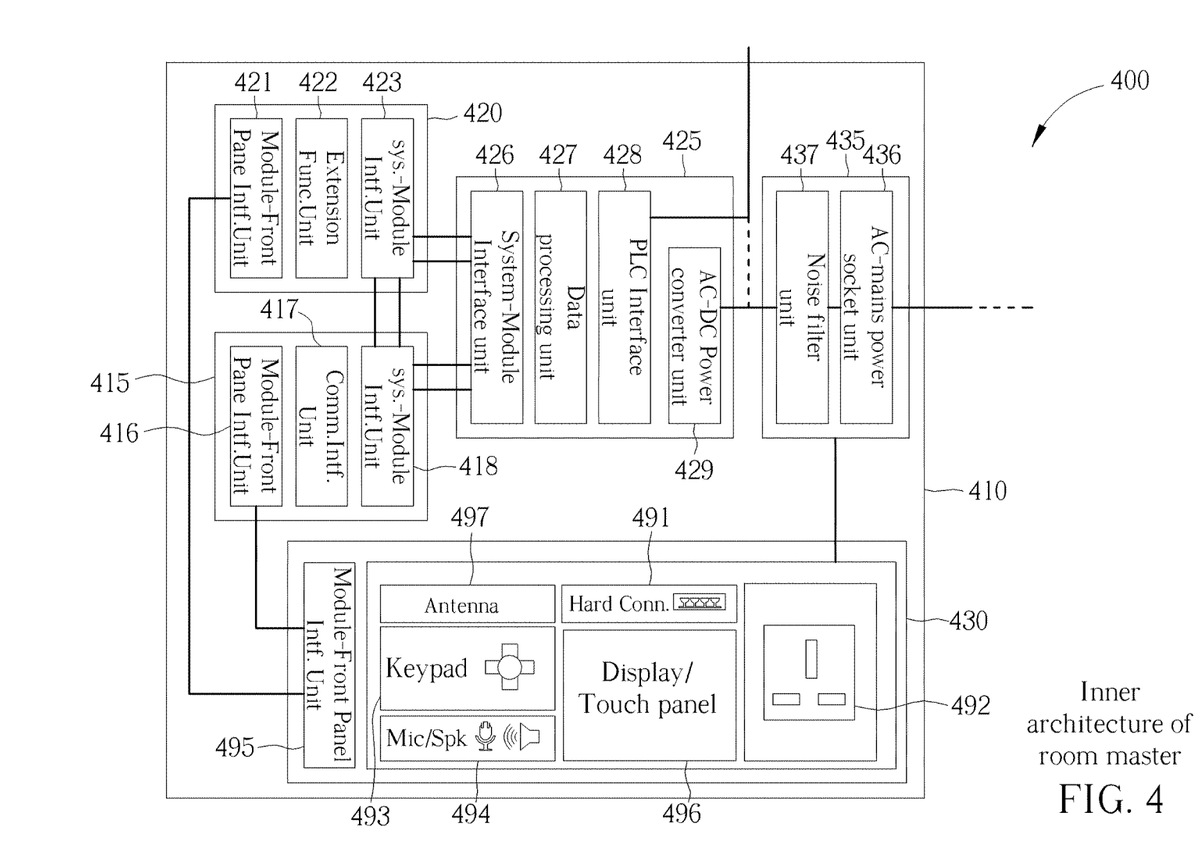
FIG. 4 illustrates reference architecture of the Room Master.

FIG. 3 illustrates the relationships of the Room Master and the external parties. FIG. 4 illustrates reference architecture of the Room Master. Referring to FIG. 3 and FIG. 4, the invention has the specific technical features, such as miniaturization, modularity, and Remote Management Package:

Miniaturization—Embed the System into a Wall-Embedded AC-Mains Power Socket.

In general, the PLC-enabled device presents as an external adapter and are installed onto the existing AC-mains socket. Usually, the appearances of the adapters obviously conflict with the existing home decoration. And, sometimes, when the adapters are installed, they also interfere with the neighboring objects (devices) on the same AC-mains socket because of their volume or inadequate design. There is also safety and security advantages in having the Room Master embedded into a wall-embedded AC-mains power socket. For example, when embedded in-wall, the chance of injury or electrical shock received by a child attempting to play with the disclosed wall-embedded Room Master is reduced at least because the device is not normally removable. Additionally, when used in a public location, theft of the device is prevented again at least because the device is not normally removable. The invention's "wall-embedded design" can solve the above mentioned problems.

Modularity—Provide the Architecture's Flexibilities to Fulfill the Different Requirements Functionality of the Room Master is highly dependent on customer requirements. At the different spaces in the home, different functions are generally required. Therefore, the modularized design is quite important for home-network planning, installation, and repair. The system 300/400 can be disassembled into six parts as shown in FIG. 3 and FIG. 4, including a "System Module" 325, 425, an "Extended-Function Module" 320, 420, a "Heterogeneous Communication Module" 315, 415, a "Standard AC-Mains Power socket Module" 335, 435, a "Front Panel" 330, 430, and a "Holder" 310, 410, each of which will be described in detail later. A Room Master preferably comprises at least the "System Module" 325, 425, the "Front Panel" 330, 430, and the "Holder" 310, 410. Besides, a Room Master also preferably includes at least one element of the optional "Extended-Function Module" 320, 420 and/or the "Heterogeneous Communication Module" 315, 415 for the specific intended purpose if the "System Module" 325, 425 does not offer it or them.

A: System Module 325, 425

"System Module" 325, 425 is a core of the system and provides the PLC interface and a host processor for data processing. The basic elements include:
Data Processing Unit 427—CPU+Memory
Protocol Converter With intelligence for the data analyzing, controls, and so on.
PLC Interface Unit 428
AC-DC Power Converter Unit 429 to provide the power for the whole system.
System-Module InterfaceUnit 426 ex. USB, UART, PCIe, Ethernet, and so on.

B: Extended-Function Module 320, 429

The "Extended-Function" module 320 acts as a companion module. The purpose is to assist the "system-module" 325, 425 to support the specific requirements. In the system, the "Extended-Function" module 320, 420 can be more than one module. The basic elements may include:
System-Module Interface Unit 423 ex. USB, UART, PCIe, Ethernet, and so on.
Extended-Function Unit 422—the elements can be:
User-Interface Unit: User-Interface unit is mainly for device setting, control, information delivery, notification, and so on. The elements like KeyPad 493, Touch Panel 496, LCD/LED 495, Mic./Speaker 494, and so on.
Sensor/Actuator Unit or others: Used to monitor the environmental status or the specific events or execute the specific actions, . . . , and so on. The elements like Temp./Humidity sensor, power meter, Relay-switch, . . . , and so on.
Module-Front-Panel Interface Unit 421 ex. GPIO, UART, USB, Parallel Bus, and so on.

C: Heterogeneous Communication Module 415

In reality, many factors, like market segments, power consumptions, cost structures, cause it to be almost impossible to plan the smart home network with a single technology. It is much more regular that many different, heterogeneous communication technologies will be presented in the home environments. The Heterogeneous Communication Module supports the system and can communicate with devices without PLC technology. In the system, the Heterogeneous Communication module 415 can be more than one module.
System-Module Interface Unit 418 ex. USB, UART, PCIe, Ethernet, and so on.
Communication Interface Unit 417—the elements can be Wi-Fi, Zigbee, Z-Wave, DECT, and so on.
Ethernet, USB, MoCA, HomePNA, and so on
Module-Front-Panel Interface Unit 416 ex. RF cable, UART, USB, Ethernet, and so on.

D: AC-mains power socket module 335, 435
Standard AC-mains Power Socket Unit 436
Noise Filter Unit 437
E: Front Panel 330, 430
Module-Front-Panel Interface Unit 495 ex. GPIO, UART, USB, Parallel Bus, and so on.
Present-Element Unit—the element can be Antenna 497—map to the "wireless" heterogeneous Communication Module 315, 415,
Hard Connector 491—map to the "wire" heterogeneous CommunicationModule 315, 415 ex. USB, RJ45, RJ11, Coax., HDMI, and so on.
User Interface—map to the Extended-Function unit 320, 420 The elements like keypad 493, touch panel 496, LCD/LED 495, Mic./Speaker 494, and so on.

AC-mains Power Socket 492—map to the AC-mains Power Socket Module 335, 435

Or others.

Cover

F: Holder 310, 410

Remote Management Package to Provide More Advanced User Experiences and Services.

Figure 5:
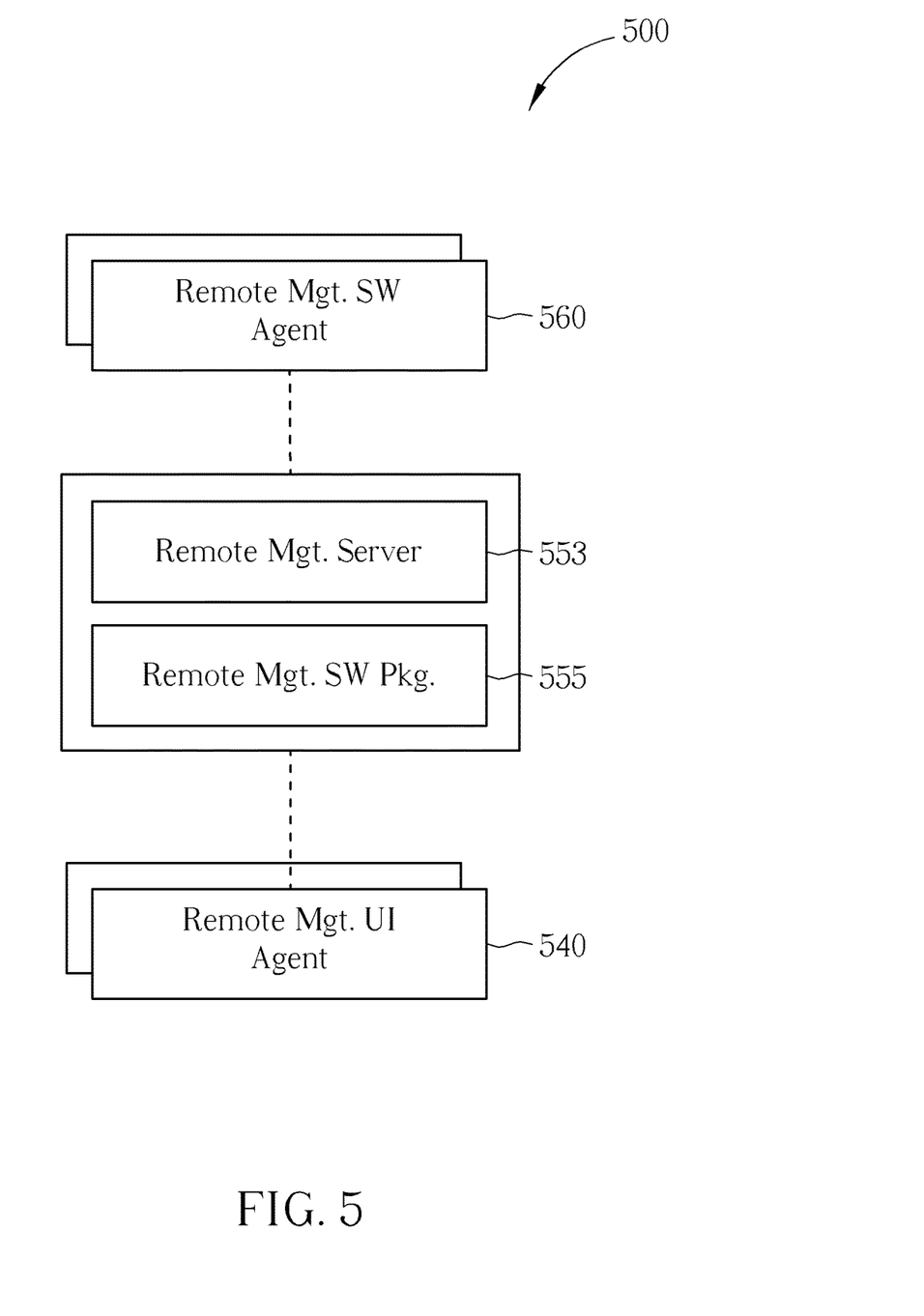
FIG. 5 illustrates a remote management package for use with the Room Master.

FIG. 5 illustrates a remote management package 500 which may be similar to the remote management package 360 shown in FIG. 3. Remote management package 500 preferably includes:

A: Remote Management Server 553

A Hardware Platform is ready for running Remote Management SW Package (555)

Remote Management Server 553 can be a PC, a residential gateway, cloud servers, . . . , and so on.

When a Room Master functions independently, it can also act as the Remote Management Server 553

B: Remote Management SW Package 555

A software package for auto-provisioning, diagnosis, control, data collection and analysis, . . . , and so on.

C: Remote Management UI Agent 540

A User Interface program, ex. Web, Apps, . . . , running on Remote Management Server 553 or the $3^{rd}$-party objects, can interwork and exchange data with Remote Management SW Package 555 through a pre-defined SW Interface.

D: Remote Management SW Agent 560

A software agent running on the Room Masters can interwork and exchange data with Remote Management SW Package 555 through a pre-defined SW Interface.

In addition, with the System Module 325, 425, equipped with PLC MAC/PHY by default, a Room Master can communicate with PLC-enabled objects 350, 355. With an optional AC power socket module 335, 435, a Room Master can supply power to the legacy electrical object (device) without generating the interfered noise to the PLC signals. With the optional Extended Function Module 320, 420, such as a power meter and Relay-Switch, a Room Master can monitor the power consumption and intelligently turn on/off the operations of the legacy electrical object over the AC power socket 335, 435. With the optional Heterogeneous Communication Module 315, 415, a Room Master can be extended to communicate with the other networks and offer the more applications. To integrate with the optional Remote Management Package, a Room Master can assist the system to offer the more advanced user experiences and services.

FIG. 5 describes architecture of remote management package 500. The Remote Management SW Package 555 runs over the centralized or distributed Remote Management Servers 553. The Remote Management SW Agent 560 and Remote Management UI Agent 540 can run over the capable clients (objects) to exchange data with the Remote Management Server 553.

EXAMPLES

Internet-Access Extender

Figure 6:
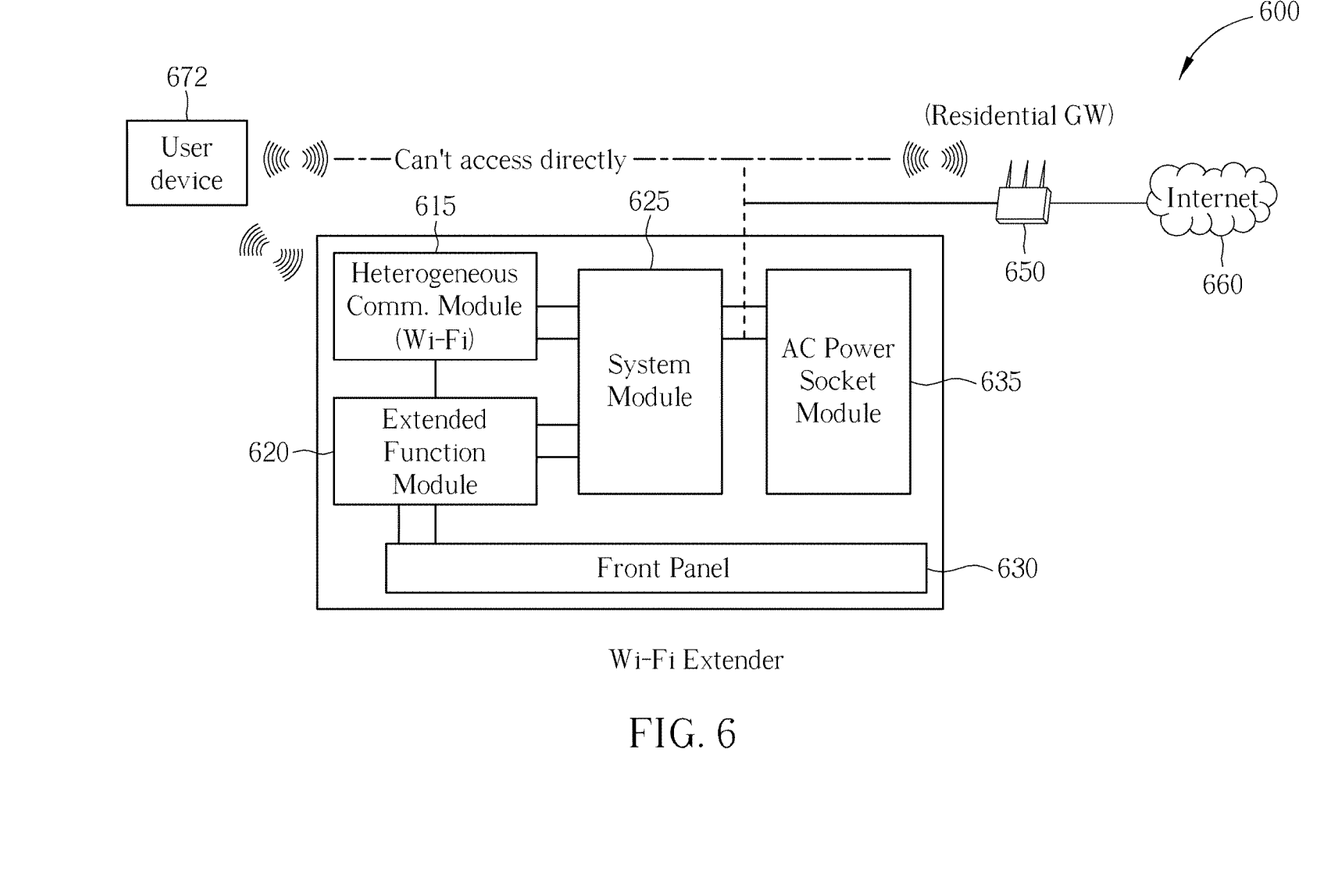
FIG. 6 illustrates a Room Master 600 being equipped with the PLC System Module, here including the system module equipped with an additional heterogeneous Wi-Fi communication module to extend the Wi-Fi service coverage.

FIG. 6 illustrates a Room Master 600 being equipped with the PLC System Module, here including the system module 625, the AC power socket module 635, the front panel 630, and the extended function module 620, also being equipped with the additional heterogeneous Wi-Fi communication module 615 to extend the Wi-Fi service coverage of the regular residential gateway 650 facilitating access by a user device 672 to the Internet 660. The similar scenario can apply for the other additional heterogeneous communication technologies, such as HomePNA, MoCA, ZigBee, beside Wi-Fi.

Home Safety

Figure 7:
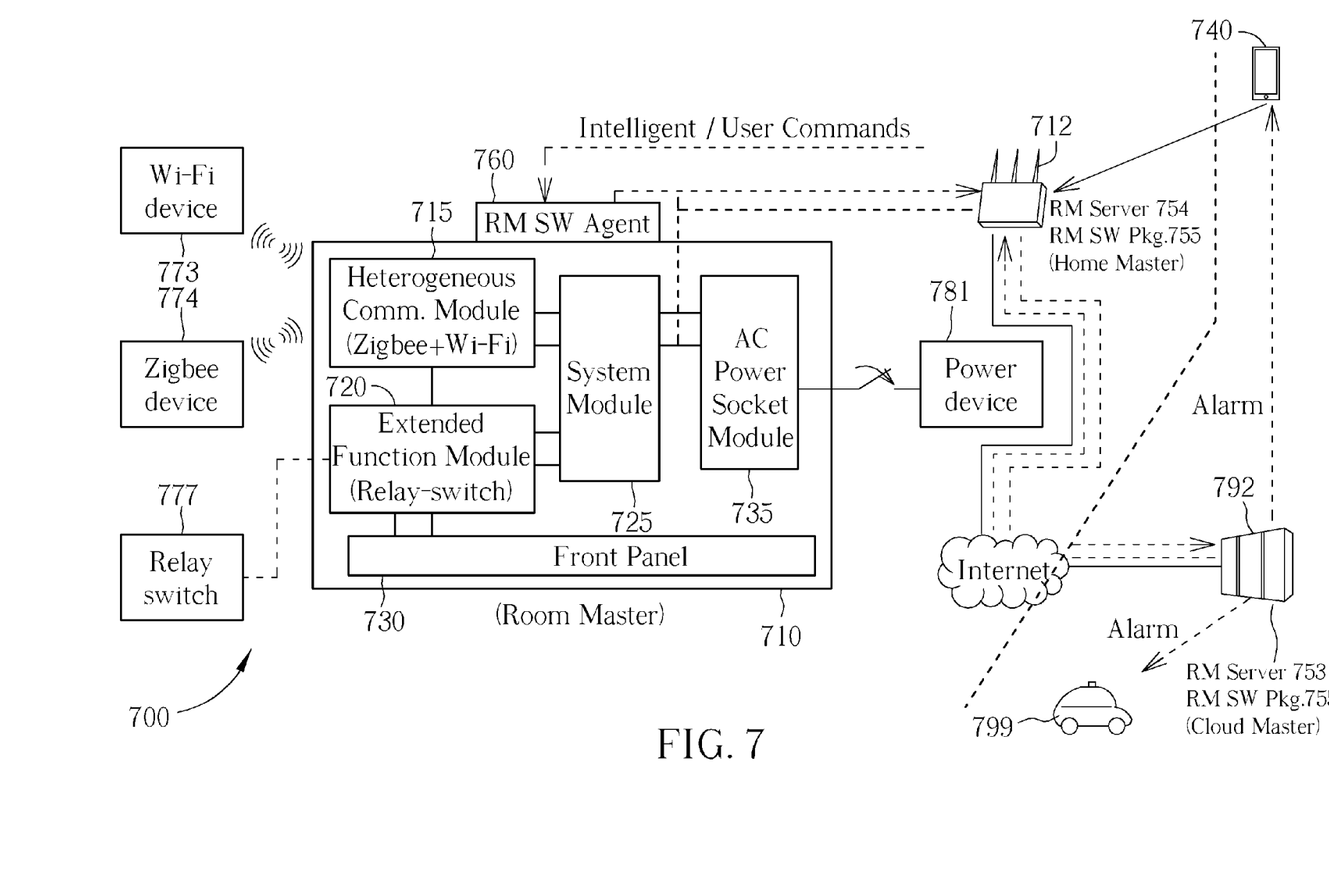
FIG. 7 illustrates a Room Master according to one embodiment.

Referring to FIG. 7, a Room Master equipped with the PLC System Module here including the system module 725 and the front panel 730, may also be equipped with:

the additional heterogeneous communication module 715, ZigBee device 774, to monitor the critical events.

the additional heterogeneous communication module 715, Wi-Fi device 773, perhaps but not limited to being a camera, to extend the service coverage.

the extended function module 720 having an embedded Relay-Switch as the actuator to control power on/off for an associated relay switch 777.

the AC power socket module 735, to supply power for the legacy electrical objects.

A Room Master, with limited intelligence, can monitor the critical events such as a fire alarm detected by the smoke sensor, and make the actions such as shut down the power, for example, to cut power to the power device 781, for the service area independently.

A Room Master, co-working with the Home Master 712/Cloud Master 792 via the Remote Management (RM) SW Agent 760, the RM Servers 753, 754, and RM SW Pkg. 755, can offload the intelligence to the Home Master 712/Cloud Master 792 to analyze and make the optimized actions for the home area.

provide the remote access capability from the Internet through the popular objects, like a smart phone 740, notebook and/or tablet computers, and so on.

provide the capability of auto-provisioning and diagnosis.

integrate with service providers to offer the advance home monitoring services. For example, when detect a illegal intrusion event by the glass break sensor, "Room Master" informs "Home Master"/"Cloud Master" of the critical event immediately. "Cloud Master" then alerts the police station 799 or the surveillance service provider for the actions.

Home Automation

Figure 8:
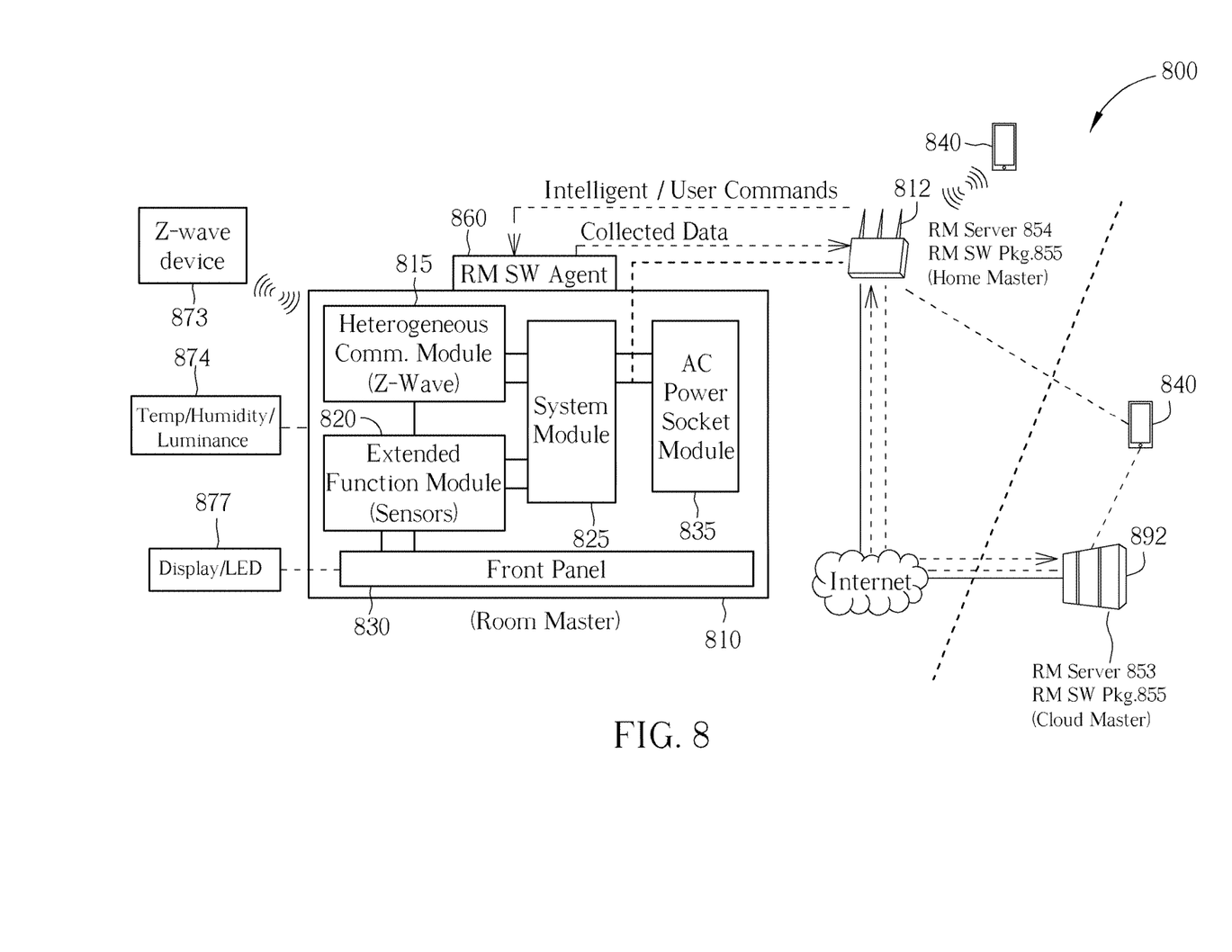
FIG. 8 illustrates a Room Master according to one embodiment.

Referring to FIG. 8, the Room Master 800 equipped with the PLC System Module here including the system module 825, the AC power socket module 835, and the front panel 830, also equips with the additional heterogeneous communication module 815 with Z-Wave technologies, to remotely control the external objects such as the Z-Wave device 873.

the embedded Temp./Humidity/Luminance sensors in the extended function module 820 to monitor the environmental index 874.

the LCD display 877 with touch panel for the local information display and operations.

A Room Master, with limited intelligence, can analyze the environmental index 874 and make the actions for the service area independently.

A Room Master, co-working with the Home Master 812/Cloud Master 892 via the RM SWAgent 860, the RM Server 853/854 and RM SW Pkg. 855, can:

offload the intelligence to the Home Master 812/Cloud Master 892 and make the optimized actions for the home area.

provide the remote access capability from the Internet through the popular objects, like a smart phone 840, notebook and/or tablet computers, and so on. For example, a user may remotely control the air conditioner via the smart phone 840.

provide the capability of auto-provisioning and diagnosis. Healthcare

Figure 9:
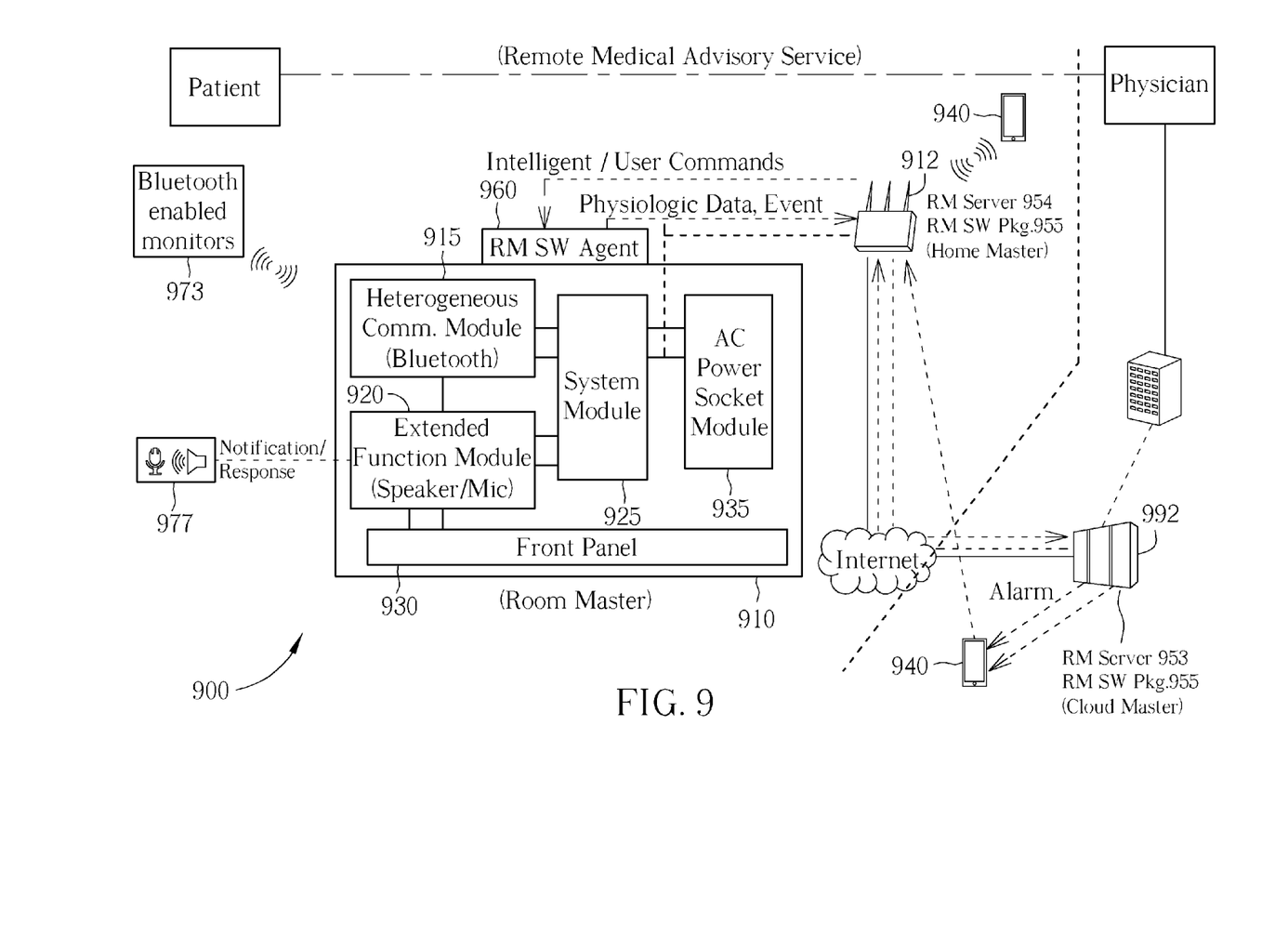
FIG. 9 illustrates a Room Master according to one embodiment.

Referring to FIG. 9, the Room Master 900 equipped with the PLC System Module here including the system module 925, the AC power socket module 935, and the front panel 930, is also equipped with:

the additional heterogeneous communication module 915 having Bluetooth (BT) functionalities, to collect the physiologic data or monitor the events generated by the BT-enabled objects 973 remotely.

the embedded speaker/microphone 977 for message notifications and responses.

A Room Master, with limited intelligence, can analyze the physiologic data and events indicated by the Bluetooth enabled monitors 973 and provide the advisements or actions independently.

A Room Master, co-working with the Home Master 912/Cloud Master 992 via the RM SW Agent 960 and RM SW Pkg. 955 and the RM Server 953/954 co-working with the Home Master 912/Cloud Master 992, can:

offload the intelligence to the Home Master 912/Cloud Master 992 and make the optimized actions.

provide the remote access capability from the Internet through the popular objects, like a smart phone 940, notebook and/or tablet computers, and so on.

provide the capability of auto-provisioning and diagnosis.

integrate with HER/PHR for life-cycle medical record.

integrate with service providers to offer the remote health advisory services. For example, FIG. 9 illustrates how a patient can interact with a physician using functions provided by the Room Master 900.

Figure 10:
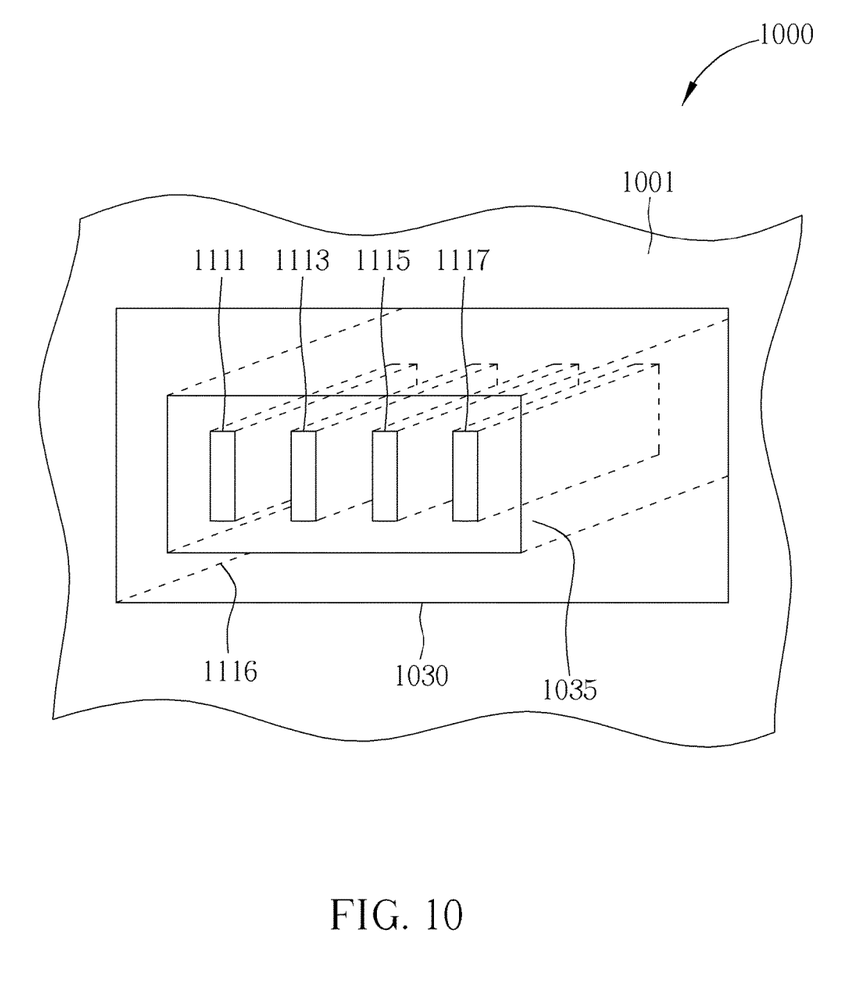
FIG. 10 illustrates a Room Master according to one embodiment.

In summary, referring to FIG. 10, the invention has a disclosed a wall-embedded power line communication device basically comprising at least a System Module 1035, a Front Plate 1030, and a Holder 1116. FIG. 10 illustrates a wall 1001 (of a home or other building) having the Front Plate 1030 substantially flush with and parallel to a major exterior surface of the wall 1001 with the System Module 1035 and Holder 1116 extending into the interior of the wall 1001 for connection, preferably directly, with an AC power line within the wall 1001. The System Module 1035 basically comprises a Data Processing Unit 1111 (which may include a memory) and an AC-DC Power Converter Unit 1113, and may also include a PLC Interface Unit 1115 and a system-module interface unit 1117. Additionally, the invention further comprises different optional additional heterogeneous communication interfaces, embedded sensor/actuator, or module each for different purposes as above mentioned.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wall-embedded power line communication device comprising:

a front plate substantially flush with and parallel to an exterior surface of a wall;

a holder coupled to the front plate and extending into an interior of the wall;

a system module within the holder, the system module providing a power line communication interface unit, a data processing unit for data processing, and a first hardware system-module interface unit, the system module configured to provide a specific or multi-functional service type; and an auxiliary module installed within the holder, the auxiliary module configured to provide the service type and comprising a second hardware system-module interface unit having means for communications with the first hardware system-module interface unit of the system module, wherein the system module is a platform connecting to at least one auxiliary module then collecting the data from each auxiliary module for integrating variant services.

2. The wall-embedded power line communication device of claim 1 wherein the system module further comprises an AC-DC power converter unit configured to provide power for the wall-embedded power line communication device.

3. The wall-embedded power line communication device of claim 2 wherein the data processing unit comprises a remote management software package executed by the data processing unit.

4. The wall-embedded power line communication device of claim 2 wherein the data processing unit comprises a remote management software agent executed by the data processing unit for communicating with a remote management server running a Remote Management software Package.

5. The wall-embedded power line communication device of claim 4 wherein the remote management software agent is further configured to offload data to the remote management server.

6. The wall-embedded power line communication device of claim 4 wherein the remote management software agent is further configured to provide remote access capability via the Internet.

7. The wall-embedded power line communication device of claim 4 wherein the remote management software agent is further configured to provide monitoring services.

8. The wall-embedded power line communication device of claim 1 wherein the auxiliary module is an extended-function module having the second hardware system-module interface unit coupled to the first hardware system-module interface unit of the system module.

9. The wall-embedded power line communication device of claim 8 further comprising a front panel coupled to the system module to provide a user interface to the wall-embedded power line communication device; wherein the extended-function module further comprises:

an extended-function unit providing a user interface and/or a sensor to monitor an environmental status and/or an actuator unit to execute specific actions; and a module-front-panel interface unit configured to provide communications between the extended-function module and the front panel.

10. The wall-embedded power line communication device of claim 9 wherein the extended-function unit includes an actuator to control power on/off for an associated relay switch.

11. The wall-embedded power line communication device of claim 1 wherein the auxiliary module is a heterogeneous communication module having the second hardware system-module interface unit coupled to the first hardware system-module interface unit of the system module and configured to communicate with devices without PLC technology.

12. The wall-embedded power line communication device of claim 11 further comprising a front panel coupled to the system module and provides a user interface to the wall-embedded power line communication device; and wherein the heterogeneous communication module further comprises:

a communication interface unit configured to communicate with devices without PLC technology; and a module-front-panel interface unit configured to provide communications between the heterogeneous communication module and the front panel.

13. The wall-embedded power line communication device of claim 12 wherein the communication interface unit is configured to communicate with devices without PLC technology using a technology selected from a group consisting of Wi-Fi, Bluetooth, Zigbee, Z-Wave, DECT, Ethernet, USB, MoCA, and HomePNA.

14. The wall-embedded power line communication device of claim 12 wherein the heterogeneous communication module includes a camera.

15. The wall-embedded power line communication device of claim 11 wherein the heterogeneous communication module is configured to remotely control external objects.

16. The wall-embedded power line communication device of claim 11 wherein the heterogeneous communication module is configured to monitor temperature and/or humidity and/or luminance in the area of the wall-embedded power line communication device.

17. The wall-embedded power line communication device of claim 11 wherein the heterogeneous communication module is configured to collect physiologic data and/or monitor events generated by remotely.

18. The wall-embedded power line communication device of claim 11 wherein the heterogeneous communication module includes an embedded speaker and/or microphone for message notifications and responses.

19. The wall-embedded power line communication device of claim 11 wherein the heterogeneous communication module is configured to integrate with service providers to offer remote health advisory services.

20. The wall-embedded power line communication device of claim 1 wherein the system module is connected to an AC power line within the wall.

* * * * *